June 24, 1958
P. PEZZAGLIA
PROCESS FOR MANUFACTURE OF GLYCIDYL
ETHERS OF POLYHYDRIC PHENOLS
Filed Jan. 31, 1955
2,840,541
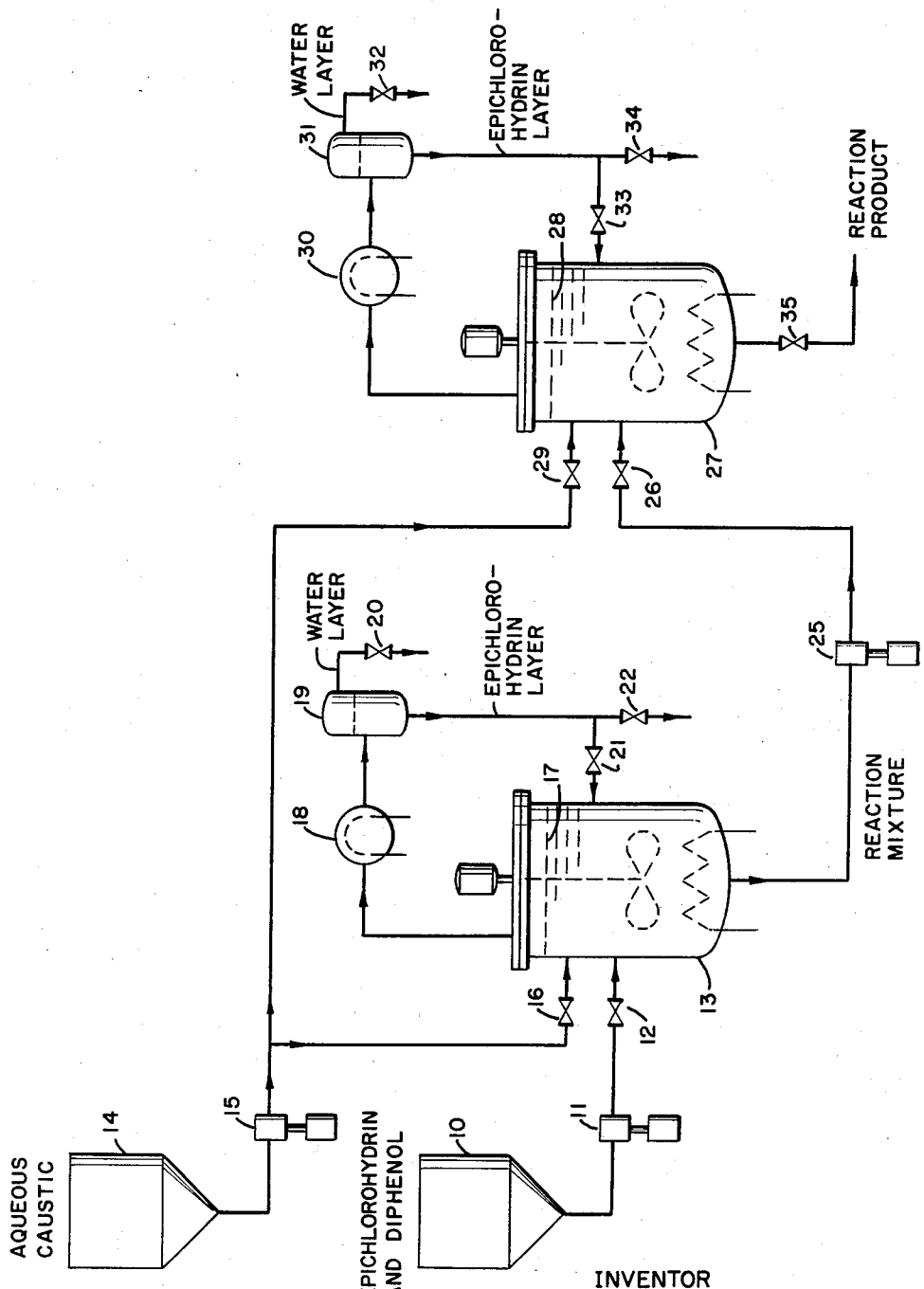
INVENTOR
PHILIP PEZZAGLIA
BY *James H. Parker*
HIS ATTORNEY

United States Patent Office 2,840,541
Patented June 24, 1958

2,840,541

PROCESS FOR MANUFACTURE OF GLYCIDYL ETHERS OF POLYHYDRIC PHENOLS

Philip Pezzaglia, El Cerrito, Calif., assignor to Shell Development Company, New York, N. Y., a corporation of Delaware Application January 31, 1955, Serial No. 484,869

5 Claims. (Cl. 260—47)

This invention relates to an improved process for manufacturing epoxy resins which are glycidyl ethers of polyhydric phenols. More particularly, the invention is concerned with production of the glycidyl ethers by a multiple stage process which is adapted to operate in a continuous manner.

Various methods have heretofore been used and proposed for preparing the epoxy resins. These methods have generally involved reaction of epichlorohydrin with a polyhydric phenol and sodium hydroxide. Most of the epoxy resins are made from a dihydric phenol. The principal constituents in these resins may be represented by the formula

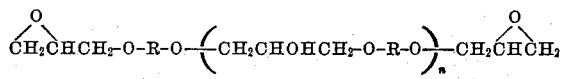

wherein $n$ is an integer of the series 0, 1, 2, 3, etc., and R represents the divalent radical to which the two phenolic hydroxyl groups are attached in the dihydric phenol.

It is desirable that the glycidyl ether product contain as much as possible of the compound wherein $n$ is zero, i. e., the diglycidyl diether of the dihydric phenol. It was discovered heretofore that by having present a substantial excess of epichlorohydrin in the reaction mixture over the stoichiometric proportion of 2 moles of epichlorohydrin per mole of the phenol, and adding an equivalent of sodium hydroxide per equivalent of epichlorohydrin that combines with the dihydric phenol in a batch process, the formation of compounds in the product having $n$ greater than zero is suppressed. While the use of such a batch method is of value for increasing the yeld of the desired glycidyl ether, reasons of efficient commercial scale manufacture of the epoxy resins necessitate that production of the resin be conducted in a continuous manner.

Upon adapting the aforementioned method to continuous production of the epoxy resin with continuous feeding in of excess epichlorohydrin and dihydric phenol, regulated continuous addition of sodium hydroxide and continuous withdrawal of product from a reaction zone, I learned that the formation of the less desired higher compounds in the product was unfortunately over four times greater than when the method was conducted in an otherwise parallel batchwise manner. I then discovered that by effecting the preparation in continuous fashion using a series of stages with addition of the caustic in portions to the several stages, the formation of the higher products was reduced effectively.

According to the process of the invention, a polyhydric phenol and sufficient epichlorohydrin to amount to at least two molecules thereof per phenolic hydroxyl group of the phenol are introduced continuously to the first of a series of successive reaction zones. Reaction mixture is continuously transferred from zone to zone in the series (including continuous withdrawal of reaction mixture from the last zone), and alkali metal hydroxide is continuously introduced to the several zones in fractions with the total thereof amounting to about an equivalent of the hydroxide per equivalent of the epichlorohydrin that reacts in the whole of the series of zones. The liquid reaction mixture in the several zones is agitated and preferably boiled while distilling water therefrom azeotropically with epichlorohydrin so that the water concentration in the reaction mixture is maintained from about 0.2 to 4% by weight. The rates of introduction of reactants, transfer of reaction mixtures and withdrawal of product are regulated so that the liquid contents in the several zones are maintained substantially constant. The improved process is illustrated in the attached drawing.

As shown in the flow diagram of the drawing wherein continuous production of glycidyl ether from a dihydric phenol (diphenol) is illustrated, the improved process of the invention in one embodiment involves use of two reaction stages. A mixture or solution of diphenol in epichlorohydrin is fed from container 10 by pump 11 through valve 12 into reactor 13 fitted with an agitator or stirrer, and means for heating its contents. It is convenient to introduce the epichlorohydrin and diphenol into the reactor as the solution containing the desired ratio of reactants. The epichlorohydrin is used in a ratio of at least 2 molecules of epichlorohydrin per phenolic hydroxyl group of the phenol, i. e., at least 2 moles of epichlorohydrin per phenolic hydroxyl equivalent of the phenol. The feed to reactor 13 as the solution of polyhydric phenol in epichlorohydrin may thus contain 2, 3, 5, 10 or more moles of epichlorohydrin per phenolic hydroxyl equivalent of the phenol. If desired, the epichlorohydrin and phenol may be fed separately to the reactor, or a solution of the phenol in part of the epichlorohydrin and the remaining chlorohydrin may be separately introduced into the reactor.

Aqueous caustic as the alkali metal hydroxide reactant is introduced from container 14 by pump 15 through valve 16 into reactor 13. Only part of the needed equivalent of hydroxide per equivalent of epichlorohydrin that combines with the phenol in the process as a whole is introduced into the first reactor. When there are two reactors providing two reaction zones as shown in the drawing, it is desirable that about 40 to 75% of the needed hydroxide be introduced into the first reaction zone. Excellent results are obtained with two reactors when about 65% of the caustic is used in the first zone and the remainder in the second. However, the hydroxide may be apportioned as desired among two or more zones with good effect. Although not essential, it is convenient to add the alkali metal hydroxide, such as sodium or potassium hydroxide, as an aqueous solution which contains at least about 15% by weight up to the saturation concentration of the hydroxide. It is preferred to use a solution containing about 40% of the hydroxide. Ordinary 48° Bé. commercial caustic soda is also suitable.

The total amount of alkali metal hydroxide used in the process is an equivalent of the hydroxide per equivalent of the epichlorohydrin reacted. This amount of hydroxide is ordinarily somewhat less than the phenolic hydroxyl equivalents of the phenol fed to the reaction system. This is because the higher ether products require less than this equivalent amount of hydroxide. For example, if the product in using a dihydric phenol were exclusively the simple diether so that $n$ would be equal to zero in the formula given hereinbefore, then 2 moles of epichlorohydrin per mole of the phenol would have reacted and 2 moles of the hydroxide would be required. However, some higher ether with $n$ equal to 1 also forms. This ether results from reaction of 3 moles of epichlorohydrin with 2 moles of the phenol so only 1.5 moles of epichlorohydrin have reacted per mole of the phenol, and consequently, only 1.5 moles of the hydroxide is required, Thus when the product consists of say 80 mole percent of the diether ($n=0$) and 20 mole percent of the triether ($n=1$), then the hydroxide required would be $$0.8 \times 2.0 + 0.2 \times 1.5 = 1.9$$

moles per mole of the phenol since this is the number of equivalents of epichlorohydrin that has reacted. If the ether product contains some organically bound chlorine due to incomplete dehydrochlorination, somewhat less than the equivalent amount of hydroxide is needed. However, some by-products of epichlorohydrin such as glycidol, glycerol, etc., will consume hydroxide in their formation with the result that somewhat more than the equivalent amount of hydroxide is required. These opposing requirements tend in general to balance one another. The important point is that sufficient hydroxide as a whole should be used that the ether product leaving the last reaction zone is substantially free of organically bound chlorine and that the reaction mixture is substantially neutral.

In reactor 13, the reaction mixture 17 is agitated and heated at boiling temperature. Most of the water introduced with the aqueous caustic and water of reaction are distilled from the reaction mixture azeotropically with epichlorohydrin, the vapor passing to condenser 18 and the condensed distillate to separator 19 where it separates into an upper water layer and a lower epichlorohydrin layer. The rate of distillation which removes water is regulated so that the reaction mixture contains about 0.2 to 4% by weight, preferably about 0.5 to 2% by weight, of water.

The distilled vapor passing to condenser 18 is not necessarily the equilibrium azeotrope of epichlorohydrin and water since the boiling reaction mixture is too deficient in water. Nevertheless, upon being condensed the distillate separates in separator 19 into an upper aqueous layer and a lower epichlorohydrin layer. The separation is effected at any convenient temperature of from about 0 to 100° C., preferably 20 to 80° C., although it is desirable to effect the separation at as low a temperature as practicable. The water layer is withdrawn through valve 20 and contains only about 5 to 10% of epichlorohydrin. It may be collected and subjected to distillation for recovery of the epichlorohydrin. The lower epichlorohydrin layer is substantially pure epichlorohydrin, usually containing less than about 1.5% water. The epichlorohydrin layer is ordinarily returned to the reaction mixture through valve 21, valve 22 being closed.

Reaction mixture 17 is withdrawn from reactor 13 by pump 25 through valve 26 into second reactor 27. The rate of withdrawal is regulated so that the net liquid contents of reaction mixture 17 is maintained substantially constant in reactor 13. This is largely governed by the sum of the rates of introduction of the aqueous caustic, and the epichlorohydrin and diphenol.

As in reactor 13, the reaction mixture 28 in reactor 27 is agitated and heated at boiling temperature. Aqueous caustic flows through valve 29 into reactor 27 at such a rate as to supply the remainder of the needed equivalent of hydroxide per equivalent of epichlorohydrin that combines with the phenol. As in reactor 13, water is azeotropically distilled from reaction mixture 28 with passage of the vapor to condenser 30 and the condensed distillate to separator 31 where it likewise separates into an upper water layer and a lower epichlorohydrin layer. The water layer is withdrawn through valve 32 for collection and combining with the water layer from reactor 13. The epichlorohydrin layer is usually returned to reactor 27 through valve 33 by having valve 34 closed. If desired, however, the epichlorohydrin layers in one or both separators 19 and 31 may be diverted from direct return by opening valves 22 and 34 with closure of valves 21 and 33. In such case, the epichlorohydrin layers may be collected, and if desired, returned as part of the feed epichlorohydrin to first reactor 13. The reaction product is withdrawn from reactor 27 through valve 35, the rate of withdrawal again being regulated so that the liquid contents of reaction mixture 28 in the reaction zone is maintained substantially constant.

Any number of reactors may be connected in series in the manner shown for reactors 13 and 27. However, from a practical standpoint, it is rarely desirable to use more than two, or possibly three reactors in series. The flow of reaction mixture through the several reactors is preferably conducted at a rate such that substantially all of the phenolic hydroxyl groups are etherified in the reaction system, i. e., that the residence time of reaction mixture and volume of the reactors is such that the product withdrawn from the last reactor is substantially free of phenolic hydroxyl groups as may be ascertained by customary chemical analysis. Although it is preferred to operate the process with removal of water from each reaction zone so that the water concentration is maintained at a low value, the process is also applicable to operation that does not involve such water removal. The process may thus be applied to a flow reactor having zones of reaction separated by baffles if desired with introduction of the hydroxide in fractions to the several zones and simply flowing the reactor contents therethrough without water removal from the individual zones.

The glycidyl ether of the polyhydric phenol is recovered from the crude reaction product in any suitable manner. The principal constituents in the product are the glycidyl ether, unreacted epichlorohydrin and formed alkali metal chloride salt. It is convenient to first filter the salt from the product. In order to recover the glycidyl ether from the salt cake, the cake is washed with epichlorohydrin or a lower alcohol such as isopropyl alcohol and the washings combined with the filtrate. The filtrate is then distilled to remove epichlorohydrin and salt-washing solvent.

Another method for recovery of the glycidyl ether from the crude product involves first subjecting the product to distillation for removal of the epichlorohydrin. To the residuum may then be added an organic liquid in which the glycidyl ether is soluble and the salt substantially insoluble such as benzene, toluene, xylene, methyl isobutyl ketone, or a mixture of an aromatic hydrocarbon and a lower aliphatic ketone, e. g., toluene and methyl ethyl ketone. It is desirable that water be at least substantially immiscible with the organic liquid since after addition of about 25 to 200 or 300% of an equal volume of organic liquid to the epichlorohydrin-free residuum, the salt may be washed from the mixture with water. If desired, the salt may be separated by filtration. The organic liquid is finally removed from the glycidyl ether product by distillation.

Although the process of the invention is particularly suitable for continuous production of glycidyl ethers of dihydric phenols, it may be used for efficient manufacture of any suitable polyhydric phenol. Typical phenols include those having phenolic hydroxyl groups attached to non-adjacent ring carbon atoms such as resorcinol, hydroquinone, chlorohydroquinones, methyl resorcinol, phloroglucinol, 1,5 - dihydroxynaphthalene, 4,4'-dihydroxydiphenyl, bis(hydroxyphenyl)methane, 1,1-bis(4 - hydroxyphenyl)ethane, 1,1 - bis(4 - hydroxyphenyl)isobutane, 2,2 - bis(4 - hydroxyphenyl)propane, which is termed bis-phenol herein for convenience, 2,2-bis(2 - hydroxy - 4 - tert - butylphenyl)propane, 2,2-bis-(2 - hydroxyphenyl)propane, 2,4' - dihydroxydiphenyldimethylmethane, 2,2-bis(2-chloro-4-hydroxyphenyl)propane, 2,2 - bis(2 - hydroxynaphthyl)pentane, 2,2 - bis-(2,5 - dibromo - 4 - hydroxyphenyl)butane, 4,4' - dihydroxybenzophenone, 1,3 - bis(4 - hydroxyphenyloxy) - 2-hydroxypropane, 4,4',4''-tris(4 - hydroxyphenyl)methane, 3-hydroxyphenyl salicylate, 4-salicoylaminophenol, as well as more complex polyhydric phenols such as novolac resins obtainable by acid catalyzed condensation of phenol, p-cresol, or other substituted phenols with aldehydes such as formaldehyde, acetaldehyde, crotonaldehyde, etc.; condensates of phenols with cardanol such as described in U. S. Patent 2,317,607; condensates of phenols with aliphatic diols such as described in U. S. Patent 2,321,620; and condensates of phenols with unsaturated fatty oils such as described in U. S. Patent 2,031,586. The polyhydric phenols contain 2 or more phenolic hydroxyl groups in the average molecule thereof and are free of other functional groups which would interfere with formation of the desired glycidyl ethers. It is evident that the process is very useful for production of the valuable glycidyl ethers of polyhydric phenols.

The invention is illustrated in the following examples, but it is not to be construed as limited to details described therein.

Example 1

Continuous production of glycidyl ether of bis-phenol was effected in an apparatus having two reactors like that illustrated in the drawing, the first reactor having a volume of 750 ml. and the second 1500 ml. A solution of bis-phenol in epichlorohydrin containing a mole ratio of epichlorohydrin to bis-phenol of 10/1 was fed at a rate of 2600 grams per hour into the first reactor. This amounted to an introduction of 1.0 mole of bis-phenol per liter of total reactor space per hour. Aqueous sodium hydroxide containing 40% by weight of the hydroxide was fed into the first reactor at a rate of 200 grams per hour. This was about 46.5% of the total hydroxide introduced into the reaction mixture. The mixture in the first reactor was stirred and boiled at about 108° C. with removal of water by azeotropic distillation with epichlorohydrin. The reaction mixture from the first reactor was withdrawn and fed directly to a second reactor wherein the mixture was stirred and boiled at 108° C. so as to remove water. The remainder of the needed aqueous sodium hydroxide was fed to the second reactor at a rate of 230 grams per hour. Crude reaction product was withdrawn continuously from the second reactor, the liquid contents in both reactors being maintained substantially constant throughout the run. The crude reaction product was collected and filtered to remove the salt (NaCl). The salt was washed with anhydrous isopropanol to adhering glycidyl ether and the wash was combined with the filtrate. The filtrate was distilled to separate unreacted epichlorohydrin and the isopropanol, and leave the glycidyl ether as residue.

The glycidyl ether had an average molecule weight of 387 as determined ebullioscopically in ethylene dichloride, and an epoxy value of 0.471 epoxy equivalent per 100 grams. Analysis showed this epoxy resin to contain 69 mole percent of the diglycidyl ether having $n=0$, and 20 mole percent of the diglycidyl ether having $n=1$, the value of $n$ referring to the formula given in the second paragraph of this specification. The remaining 11 mole percent was made up of various miscellaneous by-products.

Example 2

By way of comparison, continuous production of glycidyl ether of bis-phenol was effected in a single stage reaction system using the same rate of introduction of 1.0 mole of bis-phenol per liter of reactor space per hour. The feed consisted of a solution of bis-phenol in epichlorohydrin containing a mole ratio of epichlorohydrin to bis-phenol of 8/1. Experience had shown that no appreciable difference in yield of the desired diglycidyl diether of bis-phenol ($n=0$) could be attributed to change in the mole ratio from 10/1 to 8/1. The solution of bis-phenol was introduced at a rate of 700 grams per hour into the single reactor along with 40% aqueous sodium hydroxide at a rate of 131 grams per hour. The mixture was stirred and boiled in the reactor at about 107° C. with removal of water by azeotropic distillation with epichlorohydrin. The crude reaction product was withdrawn at such a rate that the reactor was maintained substantially full of reaction mixture as in Example 1. The glycidyl ether was isolated as in Example 1.

The glycidyl ether had an average molecular weight of 432 by ebullioscopic measurement in ethylene dichloride and an epoxy value of 0.437 epoxy equivalent per 100 grams. Analysis showed this epoxy resin to contain only 53 mole percent of the diglycidyl ether having $n=0$, and 36 mole percent of the diglycidyl ether having $n=1$.

Example 3

Another run similar to that described in Example 1 was made in the continuous two-stage reactor system. A solution containing a mole ratio of epichlorohydrin to bis-phenol of 20/1 was introduced into the first reactor at the rate of 2500 grams per hour along with 40% aqueous sodium hydroxide at a rate of 155 grams per hour. The rate of introduction of bis-phenol feed amounted to 0.55 mole of bis-phenol per liter of reactor space per hour. Into the second reactor, 40% aqueous sodium hydroxide was introduced at a rate of 85 grams per hour. The reaction mixture was withdrawn from the first reactor and flowed continuously to the second reactor from which the reaction product was withdrawn, the rates of flow being regulated so the contents of the two reactors were substantially constant and full. The mixtures in each reactor were stirred and boiled at about 107° C. with azeotropic distillation of water therefrom with epichlorohydrin. The glycidyl ether was isolated as in Example 1.

The glycidyl ether had an average molecular weight of 367 according to ebullioscopic measurement with ethylene dichloride, and an epoxy value of 0.491 epoxy equivalent per 100 grams. Analysis showed the glycidyl ether to contain 78 mole percent of the diglycidyl ether having $n=0$ and 13 mole percent of the diglycidyl ether having $n=1$.

Example 4

Another comparative run was made with the single stage reactor as in Example 3. A solution containing a mole ratio of epichlorohydrin to bis-phenol of 15/1 was introduced into the reactor at a rate of 880 grams per hour along with 48% aqueous sodium hydroxide at a rate of 85 grams per hour. The bis-phenol was introduced at a rate of 0.7 mole per liter of reactor space per hour. While stirring and boiling the reaction mixture at a temperature of 102° C., the water was removed azeotropically with epichlorohydrin. The glycidyl ether product was isolated as described above.

The ether had an average molecular weight of 420 by ebullioscopic measurement with ethylene dichloride, and an epoxy value of only 0.405 epoxy equivalent per 100 grams. Analysis showed that the ether contained only 62 mole percent of the diglycidyl ether having $n=0$ and 26 mole percent of the diglycidyl ether having $n=1$.

I claim as my invention:

1. In a process for continuous production of polyglycidyl ether of a polyhydric phenol wherein a polyhydric phenol and sufficient epichlorohydrin to amount to at least two molecules thereof per phenolic hydroxyl group are introduced continuously to the first of a series of reaction zones for reaction with alkali metal hydroxide, reaction mixture is continuously transferred from zone to zone in the series with continuous withdrawal from the last zone, and the reaction mixture in the several zones is agitated and boiled with azeotropic distillation of water and epichlorohydrin therefrom so that the water concentration in the reaction mixture is maintained at from about 0.5 to 2% by weight while regulating the rates of introduction of reactants, transfer of reaction mixture and withdrawal of product so the liquid contents in the several zones are maintained substantially constant, the improvement which comprises introducing the hydroxide to the several zones in fractions with the total thereof amounting to about an equivalent of the hydroxide per equivalent of the epichlorohydrin that reacts in the whole of the series of zones.

2. In a process for the production of polyglycidyl ether of a polyhydric phenol wherein a polyhydric phenol, epichlorohydrin and an alkali metal hydroxide are reacted in a mixture which is agitated and boiled while distilling water therefrom azeotropically with epichlorohydrin so that the water concentration in the reaction mixture is maintained from about 0.2 to 4% by weight, the improvement of effecting continuous production of the polyglycidyl ether by continuously introducing the polyhydric phenol and sufficient epichlorohydrin to amount to at least two molecules thereof per phenolic hydroxyl group of the phenol to the first of a series of reaction zones, continuously transferring reaction mixture from zone to zone in the series with continuous withdrawal from the last zone, and continuously introducing the hydroxide to the several zones in fractions with the total thereof amounting to about an equivalent of the hydroxide per equivalent of the epichlorohydrin that reacts in the whole of the series of zones, the rates of introduction of reactants, transfer of reaction mixture from zone to zone, and withdrawal of product from the last zone being regulated so that the liquid contents in the several zones are maintained substantially constant.

3. A process for the continuous production of diglycidyl ether of a dihydric phenol which comprises continuously introducing a dihydric phenol and about 6 to 20 moles of epichlorohydrin per mole of the phenol to the first of a series of two reaction zones, continuously introducing alkali metal hydroxide to the two zones in fractions with about 50 to 75% being introduced to the first zone and the total of the two fractions being about an equivalent of the hydroxide per equivalent of the epichlorohydrin that reacts in the whole of the series of zones, and continuously transferring reaction mixture from the first zone to the second while continuously withdrawing product from the second, the reaction mixture in the zones being agitated and boiled with azeotropic distillation of water and epichlorohydrin therefrom so that the water concentration in the reaction mixture is maintained at from about 0.5 to 2% by weight, and the rates of introduction of reactants, transfer of reaction mixture from zone to zone, and withdrawal of product from the last zone being regulated so that the liquid contents in the two zones are maintained substantially constant.

4. The process as defined in claim 3 wherein the distillate of water and epichlorohydrin from each reaction zone is condensed, the condensate is separated into two liquid phases, and the epichlorohydrin rich lower layer is returned to its reaction zone in continuous manner.

5. The process as defined in claim 4 wherein the dihydric phenol is 2,2-bis(4-hydroxyphenyl)propane, the alkali metal hydroxide is sodium hydroxide, and the sodium hydroxide is introduced as an aqueous solution containing from about 15% by weight up to the saturation concentration of the hydroxide.

References Cited in the file of this patent

UNITED STATES PATENTS

| | | |
|---|---|---|
| 2,134,537 | Stein | Oct. 25, 1938 |
| 2,467,171 | Werner et al. | Apr. 12, 1949 |
| 2,642,412 | Newey et al. | June 16, 1953 |
| 2,663,699 | Bloem et al. | Dec. 22, 1953 |